US011994083B2

(12) United States Patent
Puckett et al.

(10) Patent No.: US 11,994,083 B2
(45) Date of Patent: May 28, 2024

(54) ONBOARD DIAGNOSIS AND COMPENSATION FOR TIP WEAR IN FUEL INJECTOR

(71) Applicant: Caterpillar Inc., Peoria, IL (US)

(72) Inventors: Daniel Reese Puckett, Peoria, IL (US); Andrew Marrack, Peoria, IL (US); Bradley Scott Bashore, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/893,873

(22) Filed: Aug. 23, 2022

(65) Prior Publication Data

US 2024/0068424 A1 Feb. 29, 2024

(51) Int. Cl.
*F02D 41/38* (2006.01)
*F02D 41/24* (2006.01)
*F02D 41/36* (2006.01)
*F02D 41/22* (2006.01)

(52) U.S. Cl.
CPC ..... *F02D 41/3836* (2013.01); *F02D 41/2467* (2013.01); *F02D 41/365* (2013.01); *F02D 41/3845* (2013.01); *F02D 2041/224* (2013.01); *F02D 2200/0602* (2013.01)

(58) Field of Classification Search
CPC ............... F02D 41/2467; F02D 41/365; F02D 41/3836; F02D 41/3845; F02D 2041/224; F02D 2200/0602
See application file for complete search history.

(56) References Cited

U.S. PATENT DOCUMENTS 5,445,019 A 8/1995 Glidewell et al.
6,964,261 B2 11/2005 Warne et al.
8,118,006 B2 * 2/2012 Pursifull ............ F02D 19/0623 123/456
8,333,109 B2 * 12/2012 Migueis ............. F02D 41/3809 73/114.43
8,511,153 B2 * 8/2013 Serra ..................... F02D 41/221 73/114.51
10,041,432 B2 8/2018 Puckett et al.
10,260,446 B2 4/2019 Ottikkutti et al.
10,428,751 B2 * 10/2019 Uhrich .................... F01N 11/00
(Continued)

FOREIGN PATENT DOCUMENTS

CN 108361139 A * 8/2018 ......... F02D 41/2445
DE 102005041815 A1 * 3/2006 ......... F02D 41/2467
(Continued)

*Primary Examiner* — Hung Q Nguyen
*Assistant Examiner* — Mark L. Greene
(74) *Attorney, Agent, or Firm* — Brannon Sowers & Cracraft PC

(57) ABSTRACT

A fuel system for an internal combustion engine includes a fuel control system having a fueling control unit structured to determine a test point on a tip wear-sensitive region of a fuel injector delivery curve, and store measurements of pressure drops in a pressurized fuel reservoir caused by injections of fuel at the test point. The fueling control unit is further structured to produce an injector health signal based on the stored measurements of pressure drop. Related methodology and control logic for calculation of wear parameters for injection signal duration electronic trimming and prognostic health determinations are also disclosed.

17 Claims, 4 Drawing Sheets

(56) References Cited

U.S. PATENT DOCUMENTS

| | | | | |
|---|---|---|---|---|
| 10,781,777 | B2 * | 9/2020 | Brown | F02M 55/004 |
| 10,876,491 | B1 | 12/2020 | Claude et al. | |
| 2015/0068494 | A1 | 3/2015 | Robart | |

FOREIGN PATENT DOCUMENTS

| | | | |
|---|---|---|---|
| EP | 2453124 | A1 | 5/2012 |
| FR | 3083268 | B1 | 11/2020 |

* cited by examiner

ONBOARD DIAGNOSIS AND COMPENSATION FOR TIP WEAR IN FUEL INJECTOR

TECHNICAL FIELD

The present disclosure relates generally to diagnosing performance degradation in a fuel injector, and more particularly to evaluation of injector health based upon pressure drops in a pressurized fuel reservoir.

BACKGROUND

The fuel system in a modem internal combustion engine can be one of the most complex parts of the machinery. Fuel injectors must typically actuate millions or even billions of times over the course of their service life. High hydraulic pressures, rapid actuating speeds, and a generally harsh environment can cause fuel injectors to experience various wear phenomena that cause changed performance over time. It is typically desirable that each fuel injector deliver the same quantity of fuel in the same timed relationship to the engine for optimal operation, especially with respect to factors such as efficiency and emissions. When a timing of a start of fuel injection, an end of fuel injection, or a delivery amount, varies from a target the engine will tend not to perform as desired. Moreover, due to manufacturing tolerances and others factors fuel injectors may experience slightly different forms and degrees of performance degradation over time.

It is common in modern fuel systems to employ electronic trimming to compensate for injector wear by modifying control signals that govern the fuel injector's operation. One known electronic fuel injector trimming strategy is set forth in U.S. Pat. No. RE37807E1 to Shinogle et al.

SUMMARY

In one aspect, a method of operating a fuel system for an internal combustion engine includes energizing an electrical actuator in a fuel injector fluidly connected to a pressurized fuel reservoir in a fuel system, and opening an outlet check in the fuel injector based on the energizing an electrical actuator to inject a fuel from the fuel injector into a cylinder in an engine at a test point on a tip wear-sensitive region of a fuel injector delivery curve. The method further includes measuring a pressure drop in the pressurized fuel reservoir caused by the injection of the fuel, calculating a pressure drop error based on a difference between the measured pressure drop and a target pressure drop, and producing an injector health signal based on the calculated pressure drop error.

In another aspect, a fuel control system includes a fueling control unit structured to determine a test point on a tip wear-sensitive region of a fuel injector delivery curve of a fuel injector, and energize an electrical actuator in the fuel injector to inject a fuel, via opening an outlet check of the fuel injector, at the test point on the tip wear-sensitive region of the fuel injector delivery curve. The fueling control unit is further structured to store a measurement of a pressure drop in a pressurized fuel reservoir caused by the injection of fuel, and produce an injector health signal based on the stored measurement of a pressure drop.

In still another aspect, a fuel system for an internal combustion engine includes a pressurized fuel reservoir, a pressure sensor coupled to the pressurized fuel reservoir, and a plurality of fuel injectors fluidly connected to the pressurized fuel reservoir and each including a control valve electrical actuator, and an outlet check coupled to the control valve electrical actuator. The fuel system further includes a fueling control unit coupled to the pressure sensor, and in control communication with each control valve electrical actuator. The fueling control unit includes an injection wear compensation controller structured to energize each control valve electrical actuator to inject a fuel from the respective fuel injector, and to receive pressure measurements from the pressure sensor indicative of a pressure drop in the pressurized fuel reservoir caused by each respective injection of fuel. The injection wear compensation controller is further structured to calculate a pressure drop error for each respective fuel injector based on the corresponding pressure measurements, and electronically trim each respective fuel injector based on the corresponding pressure drop error.

DETAILED DESCRIPTION

Figure 1:
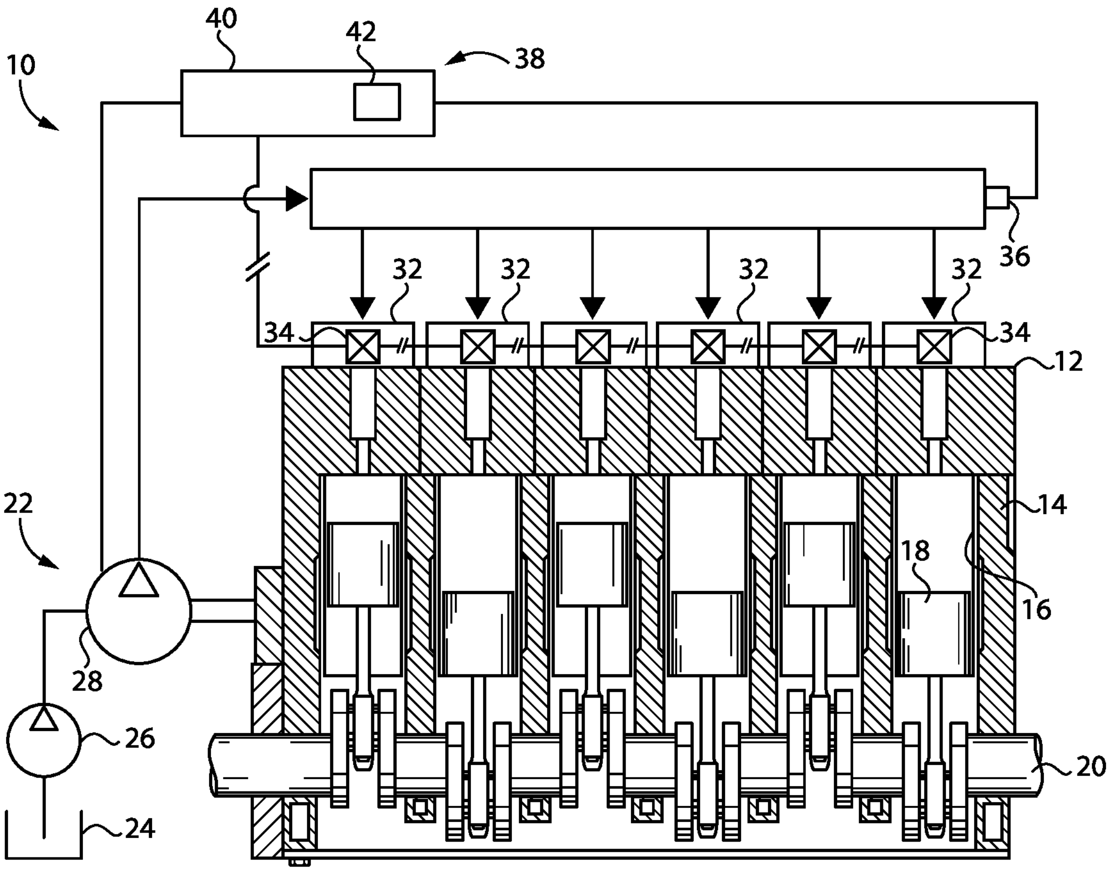
FIG. 1 is a diagrammatic view of an internal combustion engine system, according to one embodiment.

Referring to FIG. 1, there is shown an internal combustion engine system 10, according to one embodiment. Engine system 10 includes an internal combustion engine 12 having an engine housing 14 with a plurality of cylinders 16 formed therein. Cylinders 16 can include any number in any suitable arrangement such as an in-line pattern, a V-pattern, or still another. Pistons 18 are positioned within cylinders 16 and movable between a top-dead-center position and a bottom-dead-center position, typically in a four-stroke engine cycle. Pistons 18 are coupled to a crankshaft 20 rotatable via the movement of pistons 18 in a conventional manner to power a load such as a vehicle driveline, a pump, a compressor, an electrical generator, or still another. Engine system 10 may be a compression-ignition engine operable on a suitable compression-ignition liquid fuel such as a diesel distillate fuel. Engine system 10 might also be a dual fuel engine operable on a liquid pilot fuel, such as a diesel distillate fuel, that is injected in a relatively small pilot charge to ignite a larger charge of a gaseous fuel such as natural gas, methane, or various blends.

Engine system 10 also includes a fuel system 22. Fuel system 22 includes a fuel supply or tank 24, a low-pressure pump 26, a high-pressure fuel pump 28, and a pressurized fuel reservoir 30. Pressurized fuel reservoir 30 may include a so-called common rail. Pressurized fuel reservoir 30 is fluidly connected to a plurality of direct fuel injectors 32. Fuel injectors 32 are positioned to extend into cylinders 16 in a generally known manner.

Each of fuel injectors 32 includes a control valve electrical actuator 34, such as a solenoid actuator. Energizing and deenergizing electrical actuators 34 operates fuel injectors 32 to inject metered quantities or shots of fuel in direct fuel injections for combustion in cylinders 16. It has been observed that over the course of service fuel injector performance can change. When first placed in service, fuel injectors may inject precise and controllable quantities of fuel in a fuel shot based on a particular pattern of energizing and deenergizing a respective control valve electrical actuator by way of control currents having predetermined durations. Due to various types of wear and other phenomena, the correspondence between fuel injection amount and control current duration can change over time. Electronic trimming is a well-known practice for tailoring control current durations to achieve desired outcomes, particularly where fuel injector behavior has changed over time.

As will be further apparent from the following description, the present disclosure provides strategies for diagnosing injector health, and acting upon the diagnosis where appropriate to electronically trim fuel injectors to provide desired performance. In related aspects, the present disclosure provides strategies for not only evaluating and correcting present fuel injector performance but also feed forward correcting performance and prognostically estimating remaining fuel injector service life. Such estimates can be communicated to an operator or supervisory controller for such scheduling injector replacement or other service.

To this end, fuel system 22 includes a fuel control system 38. Fuel control system 38 includes a pressure sensor 36 coupled to pressurized fuel reservoir 30 and structured to produce pressure measurements indicative of a fuel pressure in pressurized fuel reservoir 30, and indicative of a pressure drop in pressurized fuel reservoir 30 caused by respective injections of fuel from fuel injectors 32.

Fuel control system 38 also includes a fueling control unit 40. Fueling control unit 40 may include any suitable computerized electronic control unit, including a processor such as a microprocessor or a microcontroller, and a computer readable memory storing various maps for performing the diagnostic and prognostic actions of the present disclosure, for electronically trimming fuel injectors 32, and for operating fuel system 22. A suitable computer readable memory may include RAM, ROM, FLASH, or any other suitable volatile or non-volatile computer readable memory.

Fueling control unit 40 may also include an injector wear compensation controller 42 including program control instructions stored on a computer readable memory, hardware, or combinations of hardware and software, structured to perform the diagnostic and prognostic actions of the present disclosure. Fueling control unit 40 is coupled to pressure sensor 36, and in control communication with each control valve electrical actuator 34.

Fueling control unit 40 and injector wear compensation controller 42, referred to at times interchangeably herein, are structured to energize each control valve electrical actuator 34 to inject a fuel from the respective fuel injector 32, and to receive pressure measurements from pressure sensor 36 indicative of a pressure drop in pressurized fuel reservoir 30 caused by each respective injection of fuel. Injector wear compensation controller 42 may also be structured to calculate a pressure drop error for each respective fuel injector 32 based on the corresponding pressure measurements, and using stored trim wraps electronically trim each respective fuel injector 32, based on the corresponding pressure drop error. The manner of executing onboard diagnosis of injector health, compensation for injector wear, and prognosis of injector service life remaining is further discussed herein.

Figure 2:
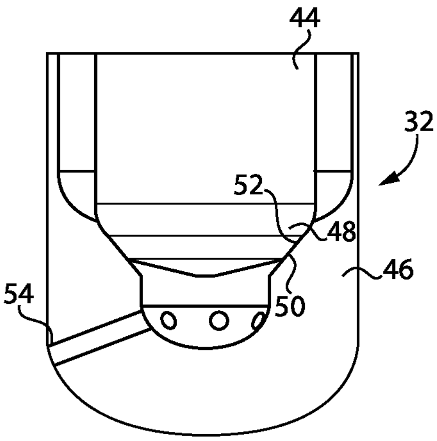
FIG. 2 is a sectioned view through a portion of a fuel injector, according to one embodiment.

Referring also now to FIG. 2, there is shown a fuel injector 32 including additional features. Fuel injectors 32 may be interchangeable for service in engine system 10, and each includes an outlet check 44 within an injector housing 46. Outlet check 44 is movable in response to actuating a control valve (not shown) via energizing and deenergizing the corresponding control valve electrical actuator 34 according to well-known principles. Each outlet check 44, referred to hereinafter at times in the singular, includes a tip 48. Tip 48 includes a seating surface 50 that contacts a valve seat 52 of injector housing 46. When seating surface 50 is in contact with valve seat 52 a flow of pressurized fuel from pressurized fuel reservoir 30 to a plurality of spray orifices 54 is blocked. When outlet check 44 is moved to open valve seat 52 the flow of pressurized fuel to spray orifices 54 is not blocked. Over the course of many impacts between outlet check 44 and valve seat 52 the metallic material forming valve seat 52, and potentially also seating surface 50, can wear and/or deform in such a way that behavior of the respective fuel injector 32 changes.

Figure 3:
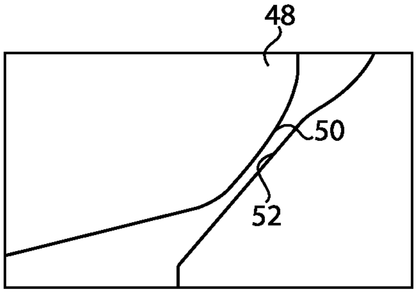
FIG. 3 is another sectioned view through the fuel injector of FIG. 2 at a wear state.
Figure 4:
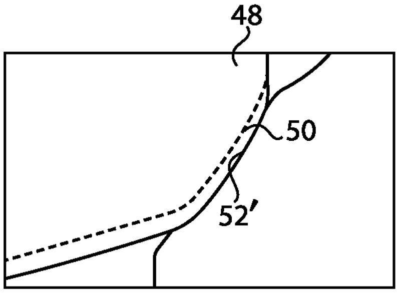
FIG. 4 is another sectioned view through a portion of the fuel injector of FIG. 2 at another wear state.

Referring to FIG. 3, there is shown in profile valve seating surface 50 and valve seat 52 as they might appear when new and first placed in service. FIG. 4 shows a slightly deformed profile of valve seat 52 (labeled 52') as might be observed when fuel injector 32 has experienced wear in service. The ghosted line in FIG. 4 indicates approximately where tip 48 of outlet check 44 would seat but for the deformation of valve seat 52. In general, the seat wear phenomenon observed is believed to stall or slow opening of outlet check 44 because less opening hydraulic force is acting on outlet check 44. As a result, check opening may be slowed and a fuel delivery loss observed. When the parts are new the pattern of contact between seating surface 50 and valve seat 52 is generally line contact. Over time, the pattern of contact changes, altering the pressure area of outlet check 44 that can be acted upon to lift outlet check 44.

It has been discovered that in certain fuel systems the delivery loss observed according to the described pattern of wear and deformation is observed only in or most predominantly in a portion of a fuel delivery range. When an outlet check is opening initially the outlet check can be understood to move ballistically between a closed, stopped position and a fully open, stopped position. It is the ballistic region of the fuel delivery curve where fuel delivery loss may be observed or most apparent in certain fuel injector designs. Once the outlet check is further opened and no longer moving ballistically between a closed position and a fully open position the described pattern of wear and/or deformation has little or no effect on fuel delivery. According to the present disclosure, diagnosis, prognosis, and electronic trimming can be focused on errors and correcting of errors in a ballistic region of a fuel injector delivery curve. In other instances, the present disclosure could be used to diagnose, prognose, and electronically trim fuel injector performance at a different tip wear-sensitive region of a fuel injector delivery curve.

Figure 5:
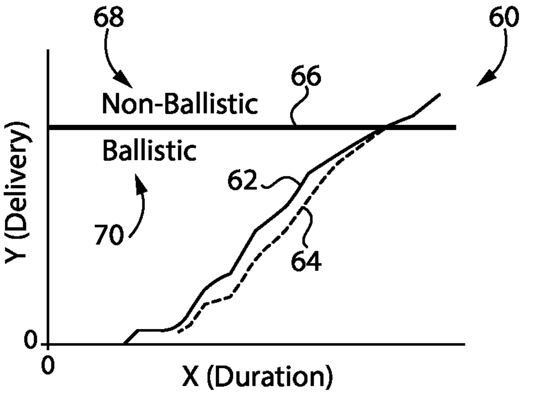
FIG. 5 is a graph of fuel delivery curves for a new fuel injector in comparison to a worn fuel injector.
Figure 6:
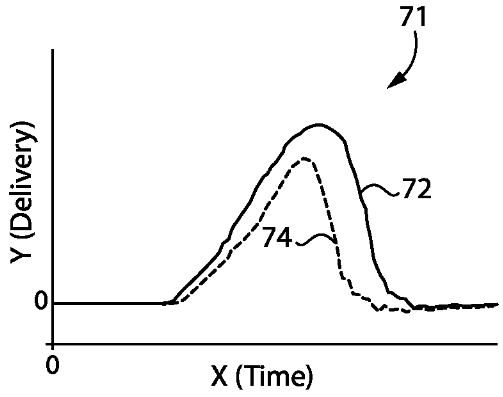
FIG. 6 is a graph of fuel delivery in the new and worn fuel injectors as in FIG. 5 in ballistic portions of the respective fuel delivery curves.

Referring also now to FIG. 5, there is shown a graph 60 illustrating an example fuel delivery curve 62 that might be observed for a fuel injector that is new and first placed in service. For comparison, an example fuel injector delivery curve 64 is shown for a worn fuel injector that has been in service for some time, typically hundreds or thousands of service hours. A threshold line 66 is also shown in graph 60 between a ballistic region 70 below threshold line 66, and a non-ballistic region 68 above threshold line 66. It can be seen that below line 66 fuel delivery curve 62 and fuel delivery curve 64 are different. Above line 66 fuel delivery curves 62 and 64 are approximately overlapping. Referring also to FIG. 6, there is shown a graph 71 illustrating an injection quantity curve 72 for a new injector in comparison with a worn injector 74, for fuel shots in ballistic regions of the delivery curves.

Figure 7:
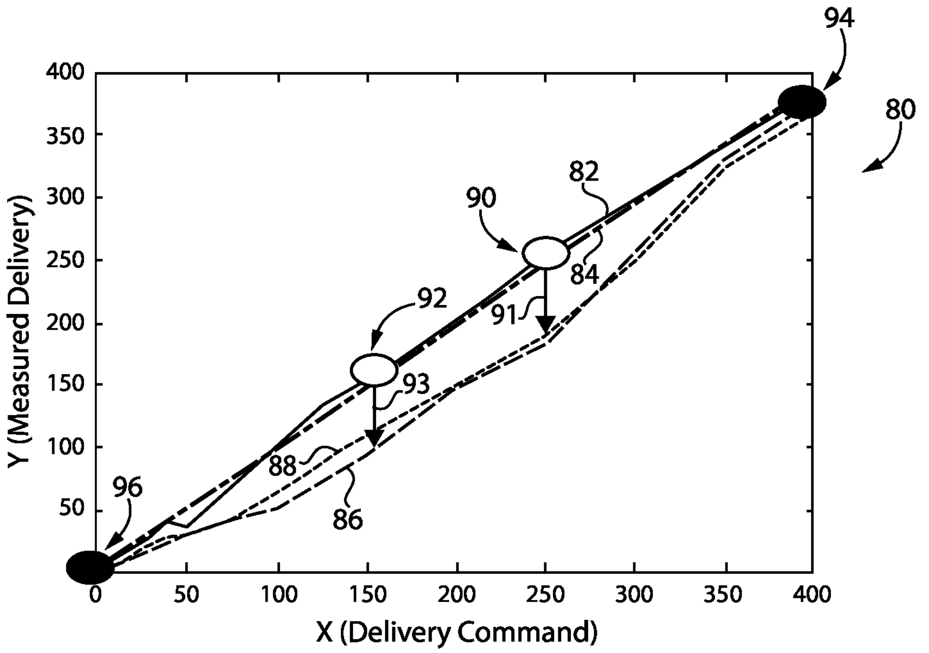
FIG. 7 is a graph of fuel delivery curves showing test points, according to one embodiment.

When a fuel injector has been in service for some time the precise fuel injector delivery curve will typically not be known. Hence, any diagnostic or corrective action may require gathering information as to how the fuel injector is performing. Referring also now to FIG. 7, there is shown a graph 80 illustrating a fuel delivery curve 82 for a new fuel injector, a nominal target fuel delivery curve 84, a fuel delivery curve 86 for a first worn fuel injector, and a fuel delivery curve 88 for a second worn fuel injector. It can be seen that both fuel delivery curve 86 and fuel delivery curve 88 show fuel delivery loss relative to fuel delivery curve 82 and nominal target 84. The relative size of the delivery loss is smaller toward the upper right portion of graph 80, along non-ballistic, tip wear-insensitive regions of the fuel delivery curves. As discussed above, fuel delivery loss may be most acute in a ballistic region of a fuel delivery curve or other tip wear-sensitive region, and less acute or nonexistent in a non-ballistic or other tip wear-insensitive region of a fuel delivery curve. As also noted above, it may be desirable to gather information about fuel injector performance prior to diagnostic, prognostic, or corrective tuning actions.

According to the present disclosure, fueling control unit 40 may operate engine system 10 in a diagnostic mode where each fuel injector is evaluated in a prescribed way to determine a relative extent of fuel delivery loss in a ballistic region of a fuel delivery curve. In an embodiment, fueling control unit 40 and wear compensation controller 42 may turn off each of a plurality of fuel injectors 32 except a fuel injector to be evaluated, and also turn off high-pressure pump 28. With the other injectors 32 and pump 28 turned off, fueling control unit 40 can determine one or more test points on a tip wear-sensitive region of a fuel delivery curve. To ensure that the test points will provide desired information, a scaling function can be executed including determining a lower test point 96 and a higher, scaling test point 94. Lower test point 96 may be a zero fuel delivery or “zeroing” test point, and higher, scaling test point 94 may be a test point on the tip wear-sensitive region of the fuel delivery curve.

To scale the delivery curve for the subject injector, fueling control unit 40 can energize the respective electrical actuator 34 to inject fuel, measure pressure drops, and preestablish test point 96 and test point 94. A measured pressure drop of zero may establish test point 96. A measured pressure drop that is the same as, or within a predefined tolerance of, a target pressure drop for a new injector, may establish test point 94. With test points 96 and 94 established, fueling control unit 40 can perform injections at test points 90 and 92, according to a pattern further discussed herein, and determine pressure drops caused in pressurized fuel reservoir 30. The measured pressure drop(s) may be compared to a target pressure drop to determine a pressure drop error. The pressure drop error at one or more of test points 90 and 92 can then serve as the basis for determining injector health, taking corrective action, and predicting service hours remaining as also further discussed herein.

Procedures at test points 90 and 92 can include energizing the respective electrical actuator 34, and opening outlet check 44 to inject a fuel from fuel injector 32 into the respective cylinder 16 at each test point 90, 92 on the ballistic region of the fuel injector delivery curve. A pressure drop in pressurized fuel reservoir 30 caused by each respective injection of the fuel can be measured by way of pressure sensor 36 and stored in computer memory. Fueling control unit 40 then calculates a pressure drop error based on a difference between the measured pressure drop and a target pressure drop and stores the pressure drop error. The pressure drop error is depicted at arrows 91 and 93 for test points 90 and 92, respectively, in FIG. 7. Typically pressure drop errors will be based on a plurality of fuel injections and a plurality of pressure drop measurements at a plurality of test points. Fueling control unit 40 may produce an injector health signal based on the calculated pressure drop error.

In an embodiment, the measured pressure drop may be less than a target pressure drop, and the injector health signal may include a pass/fail signal based on a magnitude of the pressure drop error. Put differently, it can be expected that pressure drops in pressurized fuel reservoir 30 each time a fuel injection from one of fuel injectors 32 is performed. In a new fuel injector the pressure drop might be of a given size. In a worn injector the pressure drop may be less because of the fuel delivery loss caused by tip wear as discussed herein. If the pressure drop is less than a target pressure drop by a certain magnitude or degree, it might be determined that the fuel injector has reached the end of its service life or is having other problems and should be replaced. If the magnitude of the pressure drop is not so large it can be determined that the fuel injector can be successfully corrected and remain in service. In other instances, rather than a pass/fail signal, an injector health signal could encode a relative degree of injector wear, such as a signal encoding a numerical wear parameter for the injector as further discussed herein.

Figure 8:
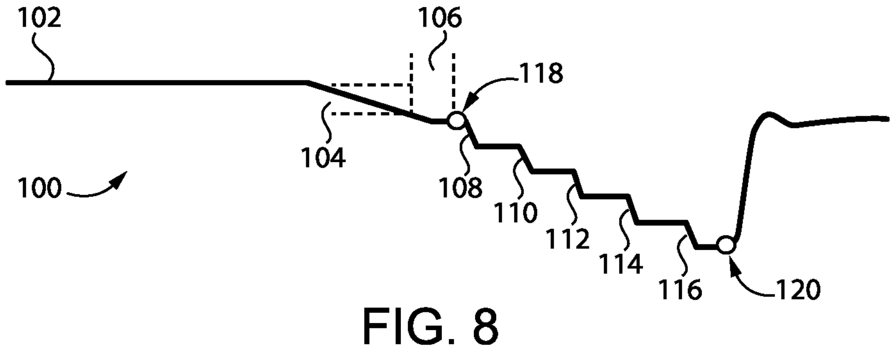
FIG. 8 is a concept diagram of a rail pressure drop-based testing strategy, according to one embodiment.

It will be recalled that each fuel injector may be evaluated by way of performing fuel injections a plurality of times and measuring a pressure drop caused by each of the injections of fuel. A pressure drop error could be an average or some other measure of statistical dispersion for each of a plurality of fuel injectors performed at each of a plurality of test points. Referring also now to FIG. 8, there is shown a diagram 100 illustrating pressure drops that can be caused by a plurality of fuel injections at a test point. Rail pressure is shown at a line 102. Line 102 shows an initial, from left to right in diagram 100, rail pressure that is stabilized, such as for a desired number of cam cycles. At approximately a region 104 injections are performed to lower rail pressure toward to a desired rail pressure for taking pressure drop measurements. In a period 106 rail pressure is again permitted to stabilize with no pumping of fuel or injection being performed, at a first rail pressure 118. At rail pressure 118 a first injection 108 at a test point is performed. At 110 a second injection at the test point is performed, and at 112, 114, and 116 successive injections are performed. By way of the plurality of injections at the test point performed sequentially, typically in a plurality of cam cycles, a plurality of measurements of pressure drop are performed that are stepped down sequentially and each caused by one of the plurality of injections of fuel at the test point. This general process can be repeated for each of fuel injectors 32 at each of test points 90 and 92, or other suitable test points, with a pressure drop error calculated based on the plurality of measurements of pressure drop 108, 110, 112, 114, and 116. After injection 116 rail pressure has dropped to a lower or second rail pressure 120, and thereafter all injectors and pump can return to normal control and begin ramping engine speed back up to a desired or normal speed. In an embodiment, the present disclosure could include performing diagnosis for each individual fuel injector according to the general strategy described, and produce an injector health signal for each. In this way, it can be determined which of the fuel injectors need replacement, further, diagnosis or other servicing. The present disclosure also contemplates evaluating the extent of wear beyond merely pass/fail by calculating a numerical wear factor for each fuel injector 32 based on the pressure drop error, as further discussed herein.

Figure 9:
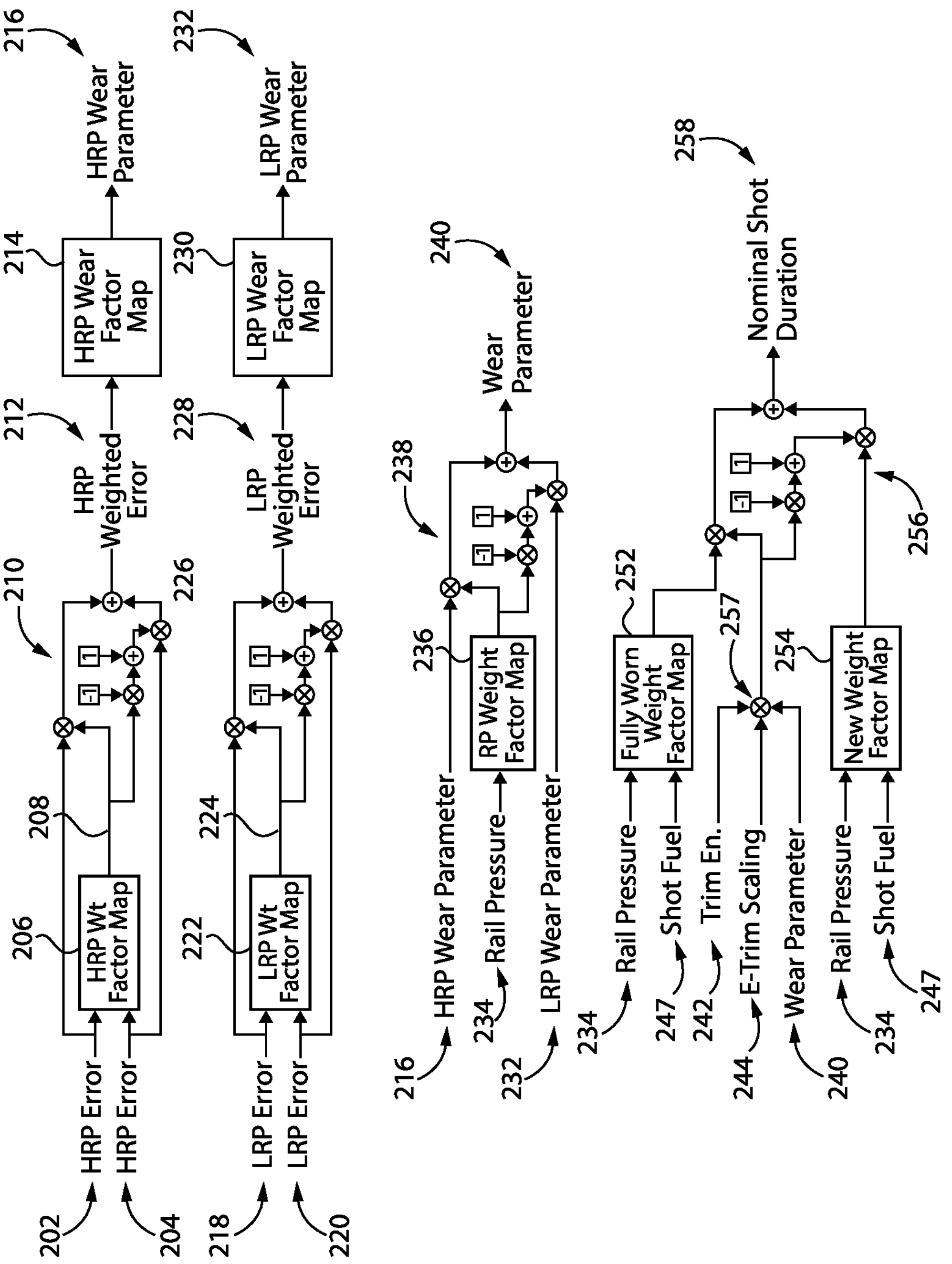
FIG. 9 is a computational diagram of injector duration correction calculations, according to one embodiment.

Turning to FIG. 9, there is shown a computational diagram 200 illustrating operations for injector duration correction according to the present disclosure. Diagram 200 shows a first HRP (higher rail pressure) error 202 and a second HRP error 204 and an HRP weight factor map 206. Diagram 200 also shows a first LRP (lower rail pressure) error 218 and a second LRP error 220 and an LRP weight factor map 222. HRP errors 202 and 204 can include pressure drop errors at two test points on a ballistic region of a fuel injector delivery curve obtained at a higher rail pressure. LRP errors 218 and 220 can analogously include pressure drop errors obtained at two test points on a ballistic region of a fuel injector delivery curve obtained at a lower rail pressure.

A map lookup via HRP weight factor map provides an HRP weight factor 208. A map lookup via LRP weight factor map 222 provides an LRP weight factor 224. At calculations 210 the HRP weight factor 208 is used to calculate an HRP weighted error 212. At calculations 226 the LRP weight factor 224 is used to calculate an LRP weighted error 228. At an HRP wear factor map 214 the HRP weighted error 212 is used to determine an HRP wear parameter 216. At an LRP wear factor map 230 LRP weighted error 228 is used to determine an LRP wear parameter 232. HRP wear parameter 216 and LRP wear parameter 232 may include numerical wear parameters indicative of a wear state of the subject fuel injector 32 taken from high rail pressure performance and low rail pressure performance, respectively.

A rail pressure input 234 is used in an RP (rail pressure) weight factor map 236. Calculations 238 consider HRP wear parameter 216 and LRP wear parameter 232 and a rail pressure weight factor 235 to calculate a wear parameter 240 for the subject fuel injection. Wear parameter 240 may be a numerical wear parameter having a value, for example, from 0 to 1, indicative of an observed relative wear state of one fuel injector. The numerical wear parameter 240 can be used to weight interpolation between a new map and a worn map for the subject fuel injector. Rail pressure 234 and a shot fuel (quantity) input 247 are used in a map lookup via a fully worn weight factor map 252. A trim enable input 242, an electronic trim scaling input 244, and wear parameter 240 are multiplied at a calculation 257. Rail pressure 234 and shot fuel 247 are used in a map lookup via a new weight factor map 254. Lookups from fully worn weight factor map 252, new weight factor map 254, and the result of calculations 257 are used in calculations 256 to determine a nominal shot duration 258.

Nominal shot duration 258 may include an electrical control current command to energize the electrical actuator 34 for the subject fuel injector 32. It will thus be appreciated that diagram 200 generally illustrates calculations to determine numerical wear parameter 240, and calculations to use the determined numerical wear parameter 240 to interpolate between fully worn map 252 and new map 254. As a result, nominal shot duration 258 is determined and used for an electronically trimmed control current command that corrects for fuel delivery loss caused by outlet check tip wear. Directionally, a worn injector may be provided a longer electrical control current than a new injector to allow the outlet check to remain open longer and thus correct for the fuel delivery loss.

Figure 10:
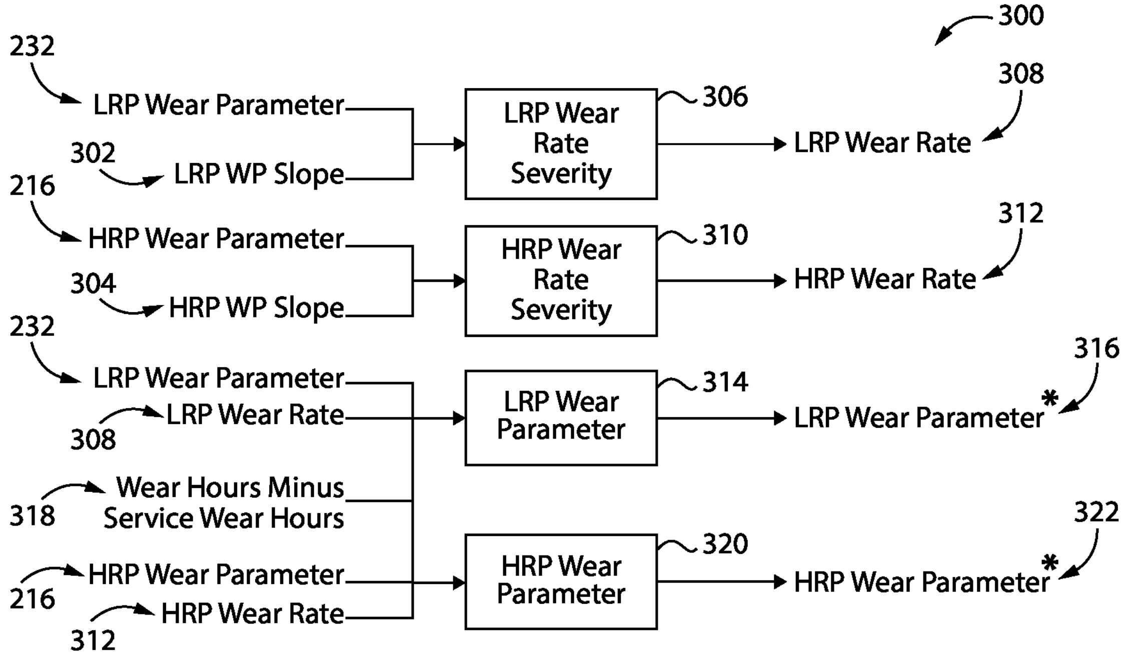
FIG. 10 is a computational diagram of injector wear parameter calculations, according to one embodiment.

Turning now to FIG. 10, there is shown a computational diagram 300 for feed forward calculations of an injector wear parameter. The feed forward determinations of diagram 300 can be used for continuing modifications to tune injector performance between service tests in some instances. Diagram 300 includes LRP wear parameter 232 and HRP wear parameter 216. LRP wear parameter 232 and an LRP wear parameter slope 302 are used in a map lookup at an LRP wear rate severity feed forward correction map 306. The map lookup using map 306 determines an LRP wear rate 308. HRP wear parameter 216 and an HRP wear parameter slope 304 are used in a map lookup at an HRP wear rate severity feed forward correction map 310 to determine an HRP wear rate 312. The LRP wear parameter slope 302 and HRP wear parameter slope 304 can be understood as slopes based on a difference between the respective wear parameters determined at the time of a service test in comparison to those wear parameters determined at the time of the last service test and stored as a wear parameter history in computer memory. A steeper slope will generally indicate more severe wear, and a shallower slope will generally indicate less severe wear.

Wear hours minus service wear hours is shown at 318. LRP wear parameter 232, LRP wear rate 308, and wear hours minus service wear hours 318 are used in a map lookup at an LRP wear parameter feed forward corrected map 318. The map lookup at map 314 determines a feed forward corrected LRP wear parameter*316. Wear hours minus service wear hours 318, HRP wear parameter 216, and HRP wear rate 312 are used in a map lookup at an HRP wear parameter feed forward corrected map 320 to determine a feed forward corrected HRP wear parameter* 322. The calculations and determinations in diagram 300 can be used to update wear trim between service tests. In other words, the map lookups in diagram 300 can enable updates to wear trim after service tests and before the next service test is performed, potentially reducing fuel delivery loss errors proactively.

Figure 11:
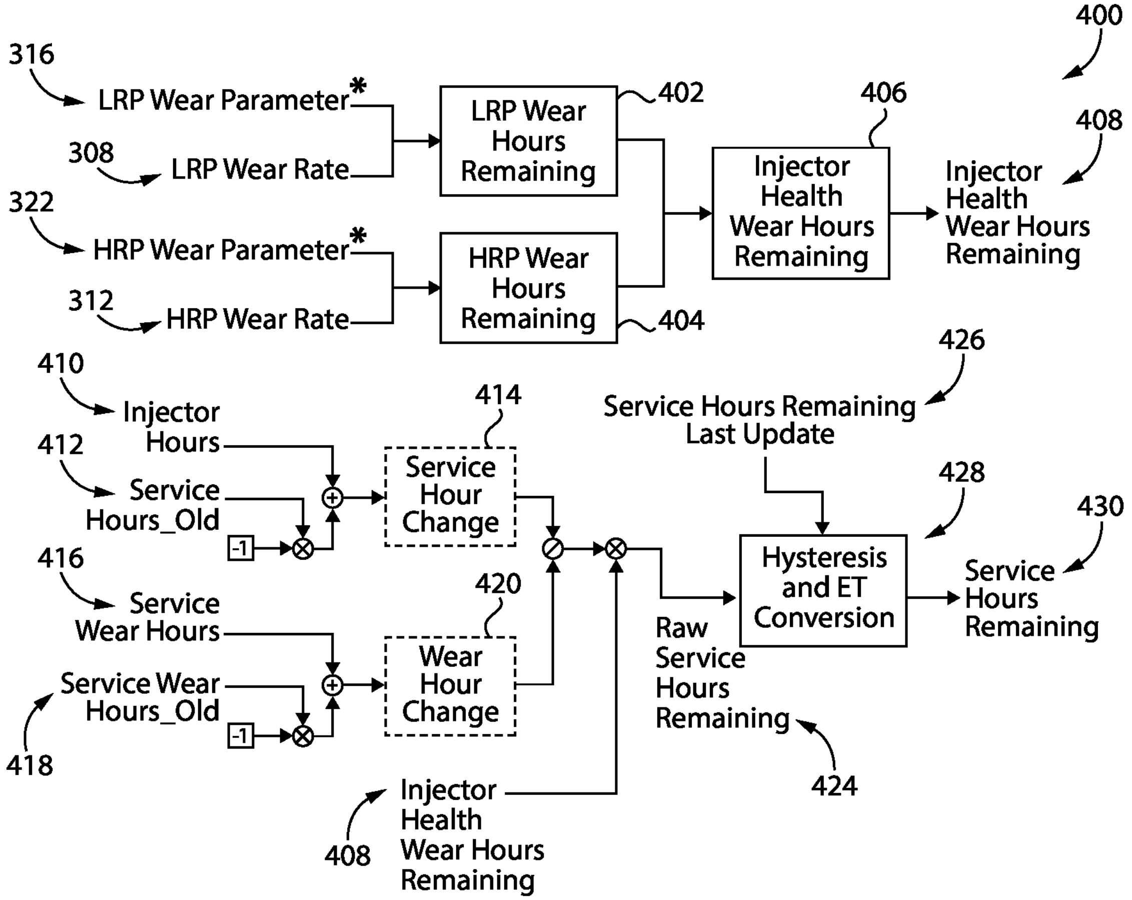
FIG. 11 is a computational diagram of injector prognostic hours remaining calculations, according to one embodiment.

Turning to FIG. 11, there is shown a computational diagram 400 for prognostically estimating injector service hours remaining. Feed forward corrected LRP wear parameter* 316 and LRP wear rate 308 are used in a map lookup at an LRP wear hours remaining map 402. Feed forward corrected HRP wear parameter* 322 and HRP wear rate 312 are used in a map lookup at an HRP wear hours remaining map 404. The results of the lookups in maps 402 and 404 are used in a map lookup in an injector health wear hours remaining map 406. The map lookup at map 406 determines an injector health wear hours remaining term 408. A total injector hours in service 410 and a prior injector service hours (service hours_old) 412 are used in a map lookup in a service hour change map 414. Service wear hours 416 and a prior service wear hours (service hours_old) 418 are used in a wear hour change map 420. The map lookups from maps 414 and 420 may be divided, and the quotient multiplied by and used in conjunction with injector health wear hours remaining 408 to determine raw service hours remaining 424. Raw service hours remaining 424 and a prior service hours remaining from the last update 426 are fed to a hysteresis and ET conversion map 428 to determine service hours remaining term 430. Service hours remaining can be stored in computer memory in association with the fuel injector that is evaluated. Procedures in diagram 400 can be understood generally as using an amount of estimated wear and wear rate to forecast wear hours of life remaining for the subject fuel injector.

INDUSTRIAL APPLICABILITY

In view of the foregoing description, it will be appreciated that the present disclosure contemplates evaluations of injector health and correction for fuel delivery loss. Injector health determination can enable a service technician or an electronic controller to determine which injectors need to be replaced, and which injectors can remain in service for some time with appropriate electronic trimming. The prognostic and forecasting aspects of the present disclosure also enable modifications between service tests to keep fuel injector operation as close to targets as is practicable.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles “a” and “an” are intended to include one or more items, and may be used interchangeably with “one or more.” Where only one item is intended, the term “one” or similar language is used. Also, as used herein, the terms “has,” “have,” “having,” or the like are intended to be open-ended terms. Further, the phrase “based on” is intended to mean “based, at least in part, on” unless explicitly stated otherwise.

What is claimed is:

1. A method of operating a fuel system for an internal combustion engine comprising:

energizing an electrical actuator in a fuel injector fluidly connected to a pressurized fuel reservoir in a fuel system;

opening an outlet check in the fuel injector based on the energizing an electrical actuator to inject a fuel from the fuel injector into a cylinder in an engine at a test point on a tip wear-sensitive region of a fuel injector delivery curve adjacent to a tip wear-insensitive region of the fuel delivery curve;

measuring a pressure drop in the pressurized fuel reservoir caused by the injection of the fuel;

calculating a pressure drop error based on a difference between the measured pressure drop and a target pressure drop; and producing an injector health signal based on the calculated pressure drop error;

wherein the test point is between a lower reference point, and a higher, scaling reference point on the tip wear-insensitive region of the fuel injector delivery curve.

2. The method of claim 1 further comprising turning off each of a plurality of other fuel injectors and a high-pressure fuel pump supplying the pressurized fuel reservoir, prior to the energizing an electrical actuator, the plurality of other fuel injectors being fluidly connected to the pressurized fuel reservoir.

3. The method of claim 2 wherein:

the injecting a fuel is one of a plurality of injections of fuel at the test point performed sequentially in a plurality of cam cycles; and the measuring a pressure drop is one of a plurality of measurements of pressure drop stepped down sequentially and each caused by one of the plurality of injections of fuel at the test point.

4. The method of claim 3 wherein the calculating a pressure drop error includes calculating the pressure drop error based on the plurality of measurements of pressure drop, and further comprising calculating a numerical wear factor for the fuel injector based on the pressure drop error.

5. The method of claim 4 further comprising calculating a prognostic service life term for the fuel injector based on the numerical wear factor and a stored wear factor history.

6. The method of claim 1 wherein the lower reference point includes a zeroing reference point.

7. The method of claim 6 wherein the tip wear-sensitive region of the fuel injector delivery curve includes a ballistic region of the fuel injector delivery curve.

8. The method of claim 7 further comprising operating the fuel system to preestablish the zeroing reference point and the higher, scaling reference point.

9. The method of claim 1 wherein the measured pressure drop is less than the target pressure drop, and the injector health signal includes a pass/fail signal based on a magnitude of the pressure drop error.

10. A fuel control system comprising:

a fueling control unit structured to:

determine a test point on a tip wear-sensitive region of a fuel injector delivery curve of a fuel injector, the tip wear-sensitive region including a ballistic region of the fuel injector delivery curve;

determine a reference point on a tip wear-insensitive region of the fuel injector delivery curve;

energize an electrical actuator in the fuel injector to inject a fuel, via opening an outlet check of the fuel injector, at the test point on the tip wear-sensitive region of the fuel injector delivery curve;

store a measurement of a pressure drop in a pressurized fuel reservoir caused by the injection of fuel; and produce an injector health signal based on the stored measurement of a pressure drop.

11. The fuel control system of claim 10 wherein the fueling control unit is further structured via operating the fuel injector to determine the test point between a zeroing point and the reference point, and the reference point including a higher, scaling point on the tip wear-insensitive region of the fuel injector delivery curve.

12. The fuel control system of claim 10 wherein the fueling control unit is further structured to compare the stored measurement of a pressure drop to a target pressure drop, and wherein the stored measurement of a pressure drop is less than the target pressure drop.

13. The fuel control system of claim 10 wherein the fueling control unit is further structured to:

energize the electrical actuator a plurality of times to perform a plurality of injections of fuel from the fuel injector at the test point sequentially;

store a plurality of pressure drop measurements stepped down sequentially and each caused by one of the plurality of injections of fuel; and calculate a pressure drop error based on the stored plurality of pressure drop measurements.

14. The fuel control system of claim 13 wherein the fueling control unit is further structured to determine a numerical wear factor for the fuel injector based on the pressure drop error.

15. The fuel control system of claim 13 wherein the fueling control unit is further structured to determine the pressure drop error based on a measured plurality of pressure drops caused by a plurality of fuel injections at a second test point on the ballistic region of the fuel injector delivery curve.

16. A fuel control system comprising:

a fueling control unit structured to:

determine a test point on a tip wear-sensitive region of a fuel injector delivery curve of a fuel injector;

energize an electrical actuator in the fuel injector to inject a fuel, via opening an outlet check of the fuel injector, at the test point on the tip wear-sensitive region of the fuel injector delivery curve;

store a measurement of a pressure drop in a pressurized fuel reservoir caused by the injection of fuel;

produce an injector health signal based on the stored measurement of a pressure drop;

energize the electrical actuator a plurality of times to perform a plurality of injections of fuel from the fuel injector at the test point sequentially;

store a plurality of pressure drop measurements stepped down sequentially and each caused by one of the plurality of injections of fuel;

calculate a pressure drop error based on the stored plurality of pressure drop measurements;

determine a numerical wear factor for the fuel injector based on the pressure drop error; and calculate a prognostic injector service life term based on the numerical wear factor.

17. A fuel system for an internal combustion engine comprising:

a pressurized fuel reservoir;

a pressure sensor coupled to the pressurized fuel reservoir;

a plurality of fuel injectors fluidly connected to the pressurized fuel reservoir and each including a control valve electrical actuator, and an outlet check coupled to the control valve electrical actuator; and a fueling control unit coupled to the pressure sensor, and in control communication with each control valve electrical actuator, and including an injector wear compensation controller;

the injector wear compensation controller being structured to:

energize each control valve electrical actuator to inject a fuel from the respective fuel injector;

receive pressure measurements from the pressure sensor indicative of a pressure drop in the pressurized fuel reservoir caused by each respective injection of fuel;

calculate a pressure drop error for each respective fuel injector based on the corresponding pressure measurements;

electronically trim each respective fuel injector based on the corresponding pressure drop error;

calculate a numerical wear factor for each fuel injector based on the respective pressure drop error; and calculate a prognostic injector service life term for each fuel injector based on the respective numerical wear factor.

* * * * *